United States Patent [19]
Kealy

[11] Patent Number: 5,865,094
[45] Date of Patent: Feb. 2, 1999

[54] FILTERED BEVERAGE MAKER

[76] Inventor: Michael J. Kealy, 1933 Piney Woods La., Virginia Beach, Va. 23456

[21] Appl. No.: 798,833

[22] Filed: Feb. 12, 1997

Related U.S. Application Data

[60] Provisional application No. 60/011,551, Feb. 13, 1996.

[51] Int. Cl.$^6$ ........................................................ A47J 31/00
[52] U.S. Cl. ............................... 99/291; 99/306; 99/323; 141/106; 141/375; 141/340
[58] Field of Search ................................ 99/291, 304, 305, 99/306, 316, 323; 141/106, 375, 340, 331; 211/74, 75

[56] References Cited

U.S. PATENT DOCUMENTS

| | | | |
|---|---|---|---|
| 1,473,898 | 11/1923 | Bossini | 99/281 X |
| 2,052,476 | 8/1936 | Koch | 99/291 |
| 2,152,410 | 3/1939 | Illy | 99/291 X |
| 2,749,004 | 6/1956 | Hilts et al. | 211/74 |
| 3,620,155 | 11/1971 | Bixby, Jr. | |
| 4,278,013 | 7/1981 | Noren et al. | 99/288 |
| 4,280,401 | 7/1981 | Cleland | 99/295 |
| 4,550,652 | 11/1985 | Da Silva | 99/279 |
| 4,619,766 | 10/1986 | Smiley et al. | 99/306 X |
| 4,667,583 | 5/1987 | Tarozzi | 99/279 |
| 4,694,738 | 9/1987 | Tarozzi | 99/279 |
| 5,055,311 | 10/1991 | Bauer, Jr. et al. | 99/295 |

*Primary Examiner*—Reginald L. Alexander
*Attorney, Agent, or Firm*—Douglas E. White

[57] ABSTRACT

A beverage maker comprises a frame which has an upper panel with one or more circular or oval apertures into which may be inserted metal or plastic holders for paper beverage filters. A middle panel comprises an adjustable drip shelf. The drip shelf is placed at a distance below the upper panel, which spacing is large enough to admit cups of typical size and small enough to prevent excessive spillage when fluid drains down from the filter holders into the cups. What spillage does occur passes through perforations in the drip shelf and is collected in a removable drip pan. Hot water is poured into individual filter holders by hand, which produces a plurality of small portions of beverage simultaneously or in rapid succession for beverage service in a commercial environment. Alternatively, fixed members for dispensing water into the filter holders can be added above the top panel, such as push-button fixed-volume fluid dispensers or manual spigots.

15 Claims, 2 Drawing Sheets

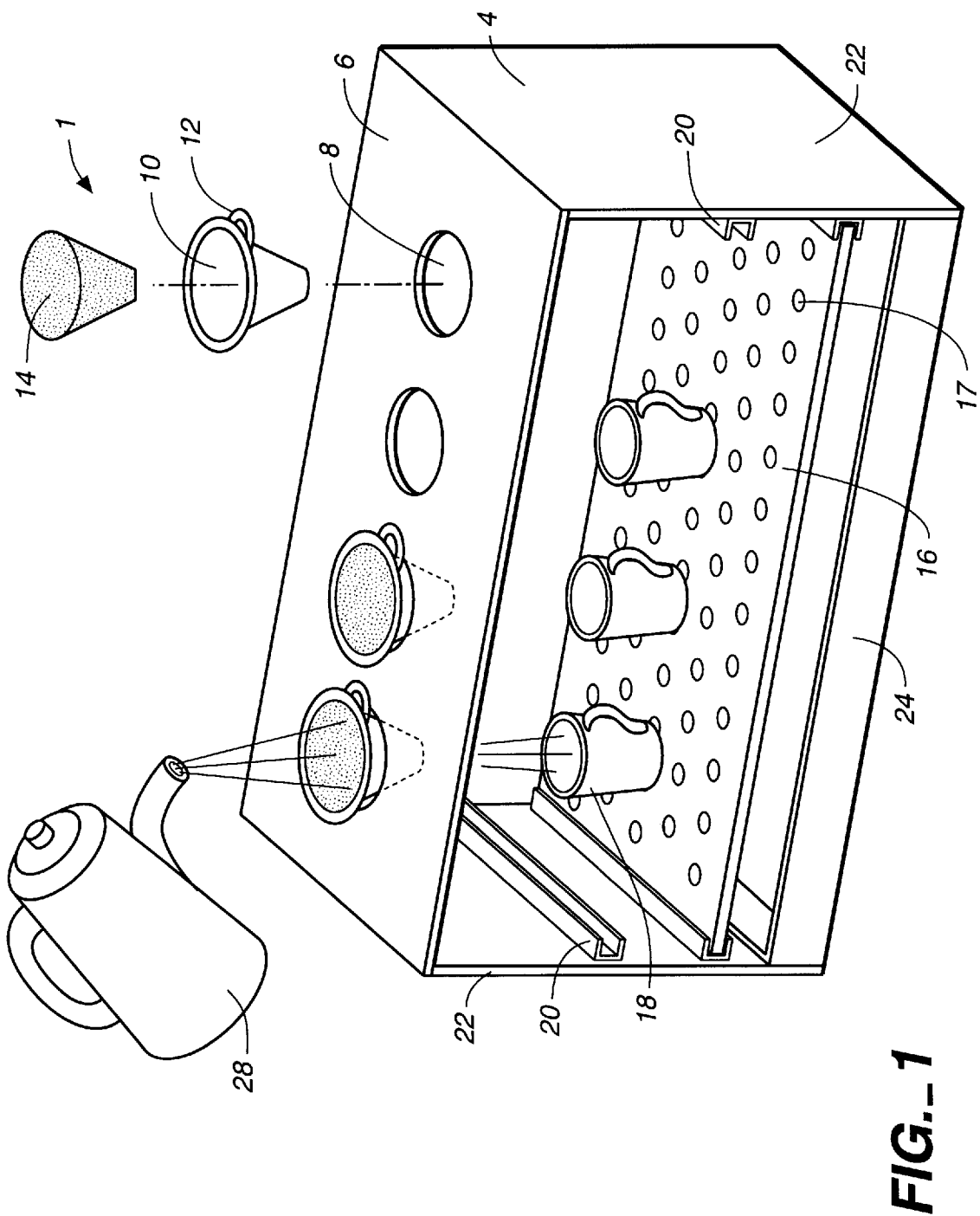
FIG._1

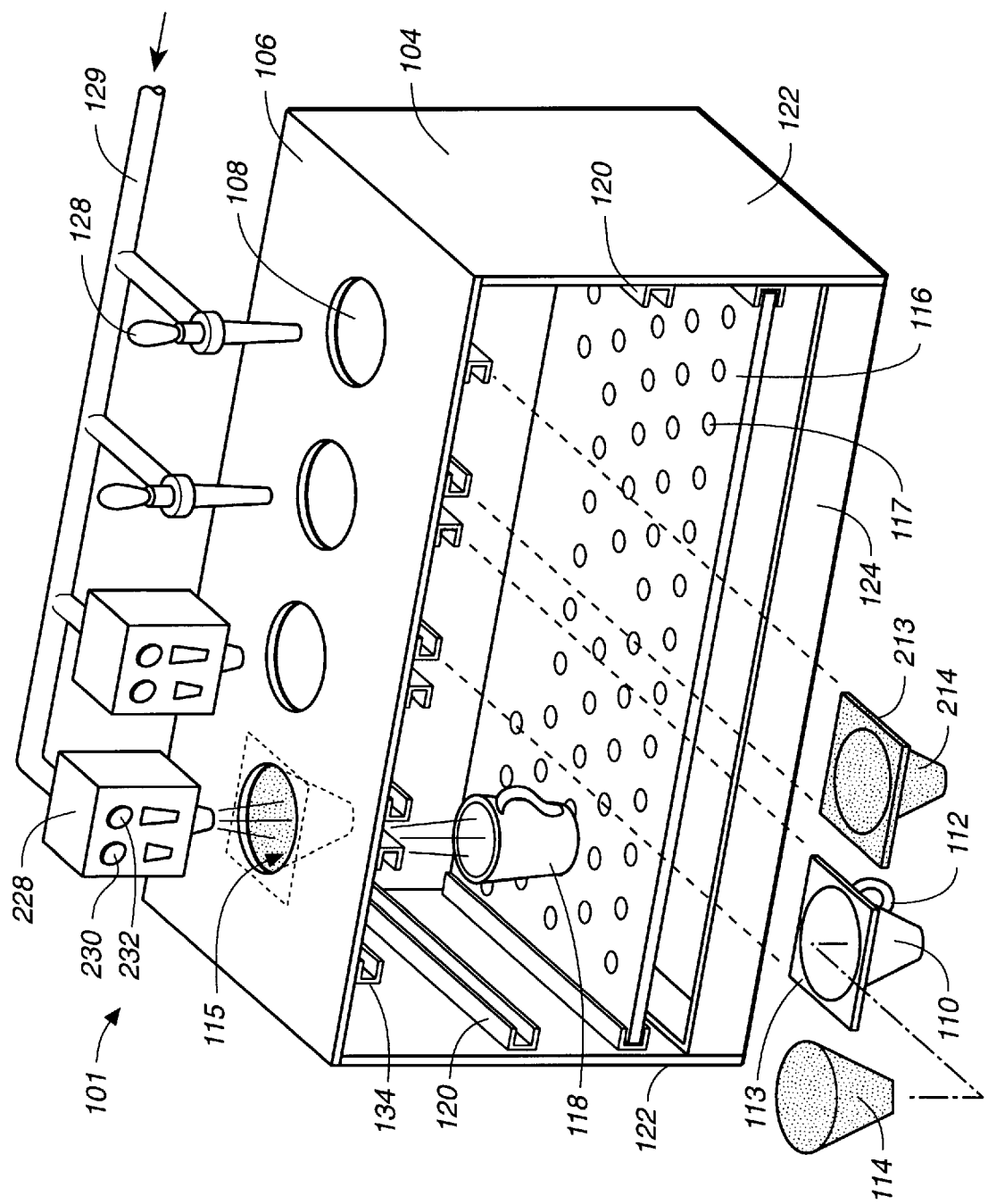
FIG._2

FILTERED BEVERAGE MAKER

CROSS REFERENCE TO RELATED APPLICATIONS

This application claims the benefit of U.S. Provisional Application No. 60/011,551, filed Feb. 13, 1996.

FIELD OF THE INVENTION

This invention relates to filtered beverage makers, more particularly to a stand for holding a plurality of filter holders. The invention allows the production of individual portions of alternate types or blends of beverage simultaneously or in rapid succession.

BACKGROUND OF THE INVENTION

Existing drip-filter beverage machines are designed to produce one container of beverage at a time—for example, a pot of drip-brewed coffee or tea. However, with today's wide range of exotic teas, coffees and special coffee blends, it is not practical for a coffee shop to brew entire potfuls of each batch of beans or leaves it has on stock. It is likely that much coffee would be wasted thereby—through going stale before enough customers would purchase from any one pot (particularly in the case of blends in low demand).

Therefore, coffee shops typically brew potfuls of only one or two of their most popular blends. Their remaining bean mixtures are available only for off-site home brewing. No efficient means of sampling or otherwise consuming them in the shop presently is available.

Therefore, a means for efficiently and quickly producing a plurality of individual fresh-brewed cups of coffee is needed. Moreover, given the demands of the commercial beverage vending market, it is desirable to be able to produce significant quantities of such cups more or less simultaneously, or in rapid succession.

The same holds true for the myriad of teas available. Although the availability of teas in bag form does provide one way for single cups to be brewed, individual bags are not a solution for a shop that offers teas that are custom blended on-site.

Prior developments in this field may be generally illustrated by reference to the following information disclosure statement:

U.S. Pat. Documents

| Patent No. | Patentee | Issue Date |
| --- | --- | --- |
| 4,550,652 | A. Da Silva | Nov. 5, 1985 |
| 5,055,311 | W. Bauer, Jr. et al. | Oct. 8, 1991 |
| 2,052,476 | A. Koch | Aug. 25, 1936 |
| 4,667,583 | R. Tarozzi | May 26, 1987 |
| 4,694,738 | R. Tarozzi | Sep. 22, 1987 |
| 4,280,401 | R. Cleland | Jul. 28, 1981 |
| 3,620,155 | G. Bixby, Jr. | Nov. 16, 1971 |
| 4,278,013 | K. Norean et al. | Jul. 14, 1981 |

U.S. Pat. No. 4,550,652 teaches a coffee maker designed to dispense coffee into multiple cups.

U.S. Pat. No. 5,055,311 teaches a stand for holding a charge of coffee grounds (hereinafter "stock"), into which stand water is poured. The water then gravity feeds a brewed beverage into a cup.

U.S. Pat. No. 2,052,476 teaches a beverage-producing device wherein water is poured into a segmented compartment, thereby to gravity feed into a single container (page 2, column 2, lines 40–42).

The rest of the patents are representative of what was found in a search of the art.

SUMMARY OF THE INVENTION

The present invention is a beverage maker comprising a frame which has an upper panel with one or more, preferably a plurality, of apertures configured to hold metal or plastic holders for paper beverage filters. A middle panel of the frame comprises an adjustable drip shelf. The drip shelf is placed at a distance below the upper panel, which spacing is large enough to admit beverage cups of typical size and small enough to prevent excessive spillage. What spillage does occur passes through perforations in the drip shelf and is collected in a removable drip pan. The drip pan may rest on a base plate of the frame, or itself may comprise the bottom base of the unit.

In the basic invention, the water (usually very hot) can be poured into individual filter holders by hand. However, fixed means for dispensing water into the filter holders can be added above the top panel, such as push-button fixed-volume fluid dispensers or manual water taps ("spigots").

In one embodiment of the invention, conical metal or plastic filter holders are inserted from above into the apertures of the top panel, and are held in place by gravity.

In an alternative embodiment, each filter holder slides into place between a pair of mutually opposed filter-holder channel-brackets that are suspended from the upper panel, below the apertures—in a manner analogous to similar channel-brackets found on existing machines designed for filtering single pots of beverage. However, in yet another alternative embodiment, the paper filters themselves are modified into integrated filtration devices through the addition of a stiff upper flange (of cardboard or plastic) to the conical filter body. The flange slides between the two channel-brackets. In this embodiment, separate filter holders are not needed—the rigid paper filtration devices are able to suspend themselves below the upper panel apertures. The paper filtration devices may be discarded after use. This eliminates the need to manipulate and periodically clean filter holders.

FEATURES AND ADVANTAGES

An object of this invention is to disclose a device able to rapidly produce small servings of coffee with minimal waste through the use of a plurality of filter holders held by a single frame.

Another object or feature is a device which is able simultaneously to produce multiple individual servings of beverage out of a plurality of beverage types or blends.

A further object is to disclose fixed manual or automatic means for dispensing water from above the device into the multiple filter holders.

Yet another feature is a drip shelf for holding individual-portion beverage containers (cups or the like), the drip shelf including means for adjusting the vertical distance between the drip shelf and an upper panel, so as effectively to adjust the distance between the tops of the beverage containers and the bottoms of the filter holders.

Still another object is to disclose a disposable filtration device for use with the beverage maker apparatus.

Accordingly, it is an object to disclose filtered beverage maker apparatus including: a frame; at least one substantially vertical support side of the frame; an open front side of the frame; a horizontal upper panel supported in the frame by the support side; and a plurality of apertures in the upper panel, each aperture configured to receive and support a separate means for filtering separate charges of beverage stock, one charge to an aperture.

A further object or feature is a plurality of means for filtering separate charges of beverage stock, one charge to an aperture.

Yet another feature of disclosed apparatus is that each filtering means may be a holder configured to contain a paper beverage filter.

Still another feature of one disclosed apparatus is each filtering means has an integral upper horizontal flange, and a lower surface of the upper panel includes a plurality of opposed pairs of filter-holder channel-brackets, into which pairs releasably slide the flanges of the filtration devices—one filtering means to a pair.

Features of preferred apparatus further include at least one horizontal drip shelf and means for adjusting the vertical distance between the drip shelf and the upper panel.

Another feature is a drip pan contained within the frame below the drip shelf.

In a disclosed apparatus, additional features are two substantially vertical support sides, the support sides mutually opposed and parallel to each other, and the adjusting means is a plurality of opposed pairs of shelf channel-brackets, one of each pair to a support side, into which opposed pairs of shelf channel-brackets releasably slides the drip shelf—one pair at a time.

Features of an alternative beverage maker apparatus include: a generally rectilinear frame; two substantially vertical support sides of the frame; an open front side of the frame; a horizontal upper panel of the frame supported by the support sides; a plurality of apertures in the upper panel, each aperture configured to receive in fluid communication therewith a separate one of a plurality of means for filtering separate charges of beverage stock; at least one drip shelf; and means for dispensing water through the apertures, the dispensing means fixed in position with respect to the frame.

A further feature of the latter apparatus is that the dispensing means may have a plurality of manual spigots attached in fluid communication with a hot water pipe. Alternatively, the dispensing means may have a plurality of automatic push-button fluid dispensers attached in fluid communication with a hot water pipe.

Another feature of this apparatus is a plurality of opposed pairs of filter-holder channel-brackets under the upper panel, into which pairs releasably slide the filtering means—one filtering means to a pair.

Another feature of the invention is an apparatus that is easy to use and clean, attractive in appearance and suitable for mass production at relatively low cost.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention.

Certain terminology and derivations thereof may be used in the following description for convenience in reference only, and will not be limiting. For example, words such as "upwardly," "downwardly," "leftward," and "rightward" would refer to directions in the drawings to which reference is made unless otherwise stated. Similarly, words such as "inwardly" and "outwardly" would refer to directions toward and away from, respectively, the geometric center of a device or area and designated parts thereof. References in the singular tense include the plural, and vice versa, unless otherwise noted.

BRIEF DESCRIPTION OF THE DRAWING

FIG. 1 is a partially exploded perspective view of a first preferred embodiment of the invention; and FIG. 2 is a partially exploded perspective view of a second embodiment of the invention.

| Drawing Reference Numerals | |
|---|---|
| 1 | beverage maker |
| 4 | frame |
| 6 | upper panel |
| 8 | aperture |
| 10 | filter holder |
| 12 | handle |
| 14 | filter |
| 16 | drip shelf |
| 17 | perforation |
| 18 | cup |
| 20 | shelf channel-bracket |
| 22 | side |
| 24 | drip pan |
| 28 | water container |
| 101 | beverage maker |
| 104 | frame |
| 106 | upper panel |
| 108 | aperture |
| 110 | filter holder |
| 112 | handle |
| 113 | flange |
| 114 | filter |
| 115 | extraction stock |
| 116 | drip shelf |
| 117 | perforation |
| 118 | cup |
| 120 | shelf channel-bracket |
| 122 | side |
| 124 | drip pan |
| 128 | manual spigot |
| 129 | pipe |
| 134 | filter-holder channel-bracket |
| 213 | flange |
| 214 | filtration device |
| 228 | fluid dispenser |
| 230 | button |
| 232 | button |

It is to be noted that, for convenience, the last two positions of the reference numerals of alternative embodiments of the invention duplicate those of the numerals of the embodiment of FIG. 1, where reference is made to similar or corresponding parts. However, it should not be concluded merely from this numbering convention that similarly numbered parts are equivalents.

DESCRIPTION OF PREFERRED EMBODIMENTS

Referring to FIG. 1, there is illustrated therein a preferred beverage maker 1. Beverage maker 1 is comprised of a frame 4 shaped into a rectilinear box having an upper panel 6, two panels forming support sides 22, two open sides (or, at least, an open front side) and, optionally, a base plate (not illustrated).

A plurality of apertures 8 in the upper panel 6 are configured to releasably hold by force of gravity a plurality of generally conical filter holders 10. The filter holders comprise separate means for filtering separate charges of beverage stock, one charge to an aperture 8. The filter holders 10 have circumferences that are congruent at one portion thereof to the circumferences of the apertures 8. For balance, the congruent portion of the holder circumferences is at the upper portion of the holders 10. Each filter holder 10 may have a grasping handle 12. A paper filter 14 is configured to nest snugly inside each filter holder 10. While of the same general shape as conventional filters and filter holders, each filter holder 10 and filter 14 has considerably smaller volumetric capacity, so as best to dispense individual portions of filtered beverage.

A cup-holding drip shelf 16 having a multiplicity of perforations 17 fits between the two mutually opposed and parallel panel sides 22 of the frame 4. It is able to slide in and out of a regularly spaced series of opposed pairs of shelf channel-brackets 20. A plurality of containers or cups 18 may be rested on the drip shelf 16 at regular intervals just below corresponding filter holder apertures 8. By moving the drip shelf 16 from one pair of shelf channel-brackets 20 to another, one is able to control the distance from the top of a cup 18 to the bottom of its associated filter holder 10, in order to allow for cups of differing heights, depending on the stock thereof of the vending establishment. In this manner, the shelf channel-brackets 20 comprise means for adjusting the vertical distance between the drip shelf 16 and the upper panel 6, so as effectively to adjust the distance between the tops of the beverage cups and the bottoms of the filter holders.

If desired, a pair of drip shelves could be substituted for the single drip shelf 16, which shelves would be supported in the middle by an appropriate panel and associated shelf channel-brackets (not illustrated). By raising one drip shelf with respect to the other, one could allow for the simultaneous use of cups of two different heights. If desirable, individually adjustable drip shelves could be provided below each upper panel aperture 8.

Below the drip shelf 16 is placed a removable drip pan 24 for collecting and disposing spilt beverage.

Individual portions of differing types or blends of beverage, such as coffee or tea, may be produced with the beverage maker 1 by pouring very hot water from suitable dispensing means, such as a water pot or container 28. From the container, the hot water is directed into the filters 14, after the latter have been filled with measured portions of beverage stock, such as coffee grounds or tea leaves.

Referring to FIG. 2, there is illustrated therein an alternate preferred beverage maker 101. Beverage maker 101 is comprised of a frame 104 shaped into a rectilinear box having an upper panel 106, two support panels forming closed sides 122, at least an open front side and perhaps an optional base plate (not illustrated).

A plurality of apertures 108 in the upper panel 106 are provided through which water may be directed into the interior of the frame 4. At least one, and preferably a plurality of filter holders 110 each have an attached upper flange 113 which slides into and mates with an opposed pair of filter-holder channel-brackets 134, in the manner of filter holder apparatus commonly found in conventional drip coffee makers. The filter holders comprise separate means for filtering separate charges of beverage extraction stock 115, one charge to an aperture 108.

Each generally conical filter holder 110 preferably will have a handle 112. A paper filter 114 is configured to nest snugly inside each filter holder 110. While of the same general shape as conventional filters and filter holders, each filter holder 110 and filter 114 is of considerably smaller volume, so as best to dispense individual portions of filtered beverage.

A drip shelf 116, having a multiplicity of perforations 117, fits between the two opposed parallel panel sides 122 of the frame 104. It is able to slide in and out of a series of opposed pairs of shelf channel-brackets 120. A plurality of cups 118 may be rested on the drip shelf 116 at regular intervals just below corresponding filter holder apertures 108. By moving the drip shelf 116 from one pair of shelf channel-brackets 120 to another, one is able to control the distance from the top of a cup 118 to the bottom of its associated filter holder 110, to allow for cups of differing heights. Below the drip shelf 116 is placed a removable drip pan 124 for collecting spilt beverage.

An alternative to conventional filter holders 110 also may be employed in this embodiment. A novel filtration device 214 is constructed of paper or similar forest-product material. The filtration device 214 incorporates its own flange 213, made of stiffened cardboard, plastic or the like. In use, the integrated filtration device 214 may be substituted for the separate filter holder 110 and filter 114. The filtration device 214 is designed to be disposable (and may be made of recyclable materials), thus eliminating a cleaning step and saving time in the use of what is designed to be an apparatus for the rapid production of individual beverage servings.

Individual portions of differing types or blends of beverage, such as coffee or tea, may be produced with the beverage maker 101 by pouring hot water from suitable dispensing means into the filters 114 after the latter have been filled with measured portions of beverage stock 115, such as coffee grounds or tea leaves.

Two alternative fixed means for dispensing water into the filter holders are illustrated in FIG. 2, both of which are connected in fluid communication with a pipe 129 that receives very hot water from any suitable source (not illustrated). First, a pair of manual spigots 128 comprise simple valves for directing water through their associated upper shelf apertures 108. These spigots open and close by hand. Second, a pair of fluid dispensers 228 is of the type commonly found in use with pre-measured soda dispensing machines. One button 230 is used to dispense one pre-measured volumetric amount of hot water from the fluid dispenser 228, and another button 232 is used to dispense a larger pre-measured amount or an amount selected by the operator by varying the amount of time the button is pushed. Pictures or other suitable indicia may be printed below the buttons to provide signals to the operator as to the function of each.

Thus, a fluid dispenser 228 may be used in combination with cups 118 of fixed but differing capacities (e.g., "regular," "large," or "custom"), whereas manual spigots 128 may be used to dispense any desired amount of water.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, various modifications, alternative constructions, and equivalents may be employed without departing from the true spirit and scope of the invention. Such changes might involve alternative materials, components, structural arrangements, sizes, operational features or the like. For example, in the case of fixed fluid dispensing means (FIG. 2) the upper panel apertures may be dispensed with, and valved water pipes directly hooked up to the upper panel to feed straight into under-slung filter holders. Similarly, the filter holders of FIG. 1 could be permanently integrated within the upper shelf—eliminating the need for apertures, but somewhat complicating the operation of cleaning the device. Therefore, the above description and illustrations should not be construed as limiting the scope of the invention, which is defined by the appended claims.

What is claimed is:

1. Apparatus for making beverage by passing water through means for filtering separate charges of beverage stock, including:

a frame;

at least one substantially vertical support side of the frame;

an open front side of the frame;

a horizontal upper panel supported in the frame by interconnection with the support side;

at least one horizontal drip shelf interconnected with the support side;

a walled drip-pan enclosed by the frame below the drip shelf; and a plurality of apertures in the upper panel, each aperture configured to receive and support a separate means for filtering separate charges of beverage stock, one charge to an aperture.

2. Filtered beverage maker apparatus including:

a frame;

at least once substantially vertical support side of the frame;

an open front side of the frame;

a horizontal upper panel supported in the frame by interconnection with the support side;

a plurality of means for filtering separate charges of beverage stock; and a plurality of apertures in the upper panel, each aperture configured to receive and support a separate one of the filtering means.

3. The apparatus of claim 2 wherein:

each filtering means is a holder configured to contain a paper beverage filter.

4. The apparatus of claim 2 wherein:

each filtering means has an integral upper horizontal flange, and a lower surface of the upper panel includes a plurality of opposed pairs of filter-holder channel-brackets, into which pairs releasably slide the flanges of the filtration devices, one filtering means to a pair.

5. The apparatus of claim 2 further including:

at least one horizontal drip shelf mounted in the frame by interconnection with the support side; and means for adjusting the vertical distance between the drip shelf and the upper panel.

6. The apparatus of claim 5 further including:

a drip pan contained within the frame below the drip shelf.

7. The apparatus of claim 5 wherein:

there are two substantially vertical support sides, the support sides mutually opposed and parallel to each other, and the adjusting means is a plurality of opposed pairs of shelf channel-brackets, one of each pair to a support side, into which opposed pairs of shelf channel-brackets releasably slides the drip shelf, one pair at a time.

8. Apparatus for making beverage by passing water through means for filtering separate charges of beverage stock, including:

a generally rectilinear box-like frame;

two substantially vertical support sides of the frame;

an open front side of the frame;

a horizontal upper panel supported in the frame by the support sides;

a plurality of circular or oval apertures in the upper panel, each aperture configured to receive and support a separate one of a plurality of means for filtering separate charges of beverage stock;

at least one horizontal mounted in the frame between the sides thereof;

a plurality of fluid-passing perforations in drip shelf; and means for adjusting the vertical distance between the drip shelf and the upper panel.

9. Apparatus for making beverage by passing water through means for filtering separate charges of beverage stock, including:

a generally rectilinear box-like frame;

two substantially vertical support sides of the frame;

an open front side of the frame;

a horizontal upper panel supported in the frame by the support sides;

a plurality of circular or oval apertures in the upper panel, each aperture configured to receive and support a separate one of a plurality of means for filtering separate charges of beverage stock;

at least one horizontal drip shelf mounted in the frame between the sides thereof;

a drip pan enclosed by the frame below the drip shelf; and means for adjusting the vertical distance between the drip shelf and the upper panel.

10. The apparatus of claim 9 wherein:

the support sides are mutually opposed and parallel to each other, and the adjusting means is a plurality of opposed pairs of shelf channel-brackets one of each pair to a support side, into which opposed pairs of shelf channel-brackets releasably slides the drip shelf, one pair at a time.

11. The apparatus of claim 10 further including:

a plurality of paper filter holders, each filter holder having a handle for the manual grasping thereof.

12. Apparatus for making beverage by passing water through means for filtering separate charges of beverage stock, including:

a generally rectilinear frame;

two substantially vertical support sides of the frame;

an open front side of the frame;

a horizontal upper panel of the frame supported by the support sides;

a plurality of opposed pairs of filter-holder channel-brackets under the upper panel;

a plurality of apertures in the upper panel, each aperture configured to receive in fluid communication therewith a separate one of a plurality of means for filtering separate charges of beverage stock;

at least one drip shelf mounted in the frame between the sides thereof; and means for dispensing water through the apertures, the dispensing means fixed in position with respect to the frame.

13. The apparatus of claim 12 wherein:

the dispensing means has a plurality of manual spigots attached in fluid communication with a hot water pipe.

14. The apparatus of claim 12 wherein:

the dispensing means has a plurality of automatic push-button fluid dispensers attached in fluid communication with a hot water pipe.

15. Filtered beverage maker apparatus including:

a generally rectilinear frame;

two substantially vertical support sides of the frame;

an open front side of the frame;

a horizontal upper panel of the frame supported by the support sides;

means for filtering separate charges of beverage stock;

a plurality of opposed pairs of filter-holder channel-brackets under the upper panel, into which pairs releasably slide the filtering means, one filtering means to a pair;

a plurality of apertures in the upper panel, each aperture configured to receive in fluid communication therewith a separate filtering means;

at least one drip shelf mounted in the frame between the sides thereof;

means for dispensing water through the apertures, the dispensing means fixed in position with respect to the frame;

a hot water pipe; and in the dispensing means, a plurality of automatic push-button fluid dispensers attached in fluid communication with the hot water pipe.

* * * * *